(12) United States Patent
Vankayala et al.

(10) Patent No.: US 12,739,806 B2
(45) Date of Patent: Sep. 15, 2026

(54) METHOD AND BASE STATION FOR RESOURCE ALLOCATION FOR MOBILITY MANAGEMENT OF USER EQUIPMENT

(71) Applicant: SAMSUNG ELECTRONICS CO., LTD., Suwon-si (KR)

(72) Inventors: Satya Kumar Vankayala, Bangalore (IN); Venkateswarlu Yarramala, Bangalore (IN); Seungil Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 468 days.

(21) Appl. No.: 18/208,085

(22) Filed: Jun. 9, 2023

(65) Prior Publication Data

US 2023/0319805 A1 Oct. 5, 2023

Related U.S. Application Data

(63) Continuation of application No. PCT/KR2021/005450, filed on Apr. 29, 2021.

(30) Foreign Application Priority Data

Dec. 9, 2020 (IN) ............................ 202041053554

(51) Int. Cl.
*H04W 28/20* (2009.01)
*G06N 3/08* (2023.01)
(Continued)

(52) U.S. Cl.
CPC .......... *H04W 72/0453* (2013.01); *G06N 3/08* (2013.01); *H04W 72/542* (2023.01)

(58) Field of Classification Search
CPC ..... H04W 24/02; H04W 72/51; H04W 24/10; H04W 72/0453; H04W 72/543;
(Continued)

(56) References Cited

U.S. PATENT DOCUMENTS 10,476,718 B1 11/2019 Park et al.
2018/0183551 A1* 6/2018 Chou ..................... H04L 5/001
(Continued)

FOREIGN PATENT DOCUMENTS

EP 3 471 329 A1 4/2019
KR 10-2020-0040073 A 4/2020
(Continued)

OTHER PUBLICATIONS

Communication issued on Jun. 30, 2022 by the Indian Patent Office for Indian Patent Application No. 202041053554.
(Continued)

*Primary Examiner* — Quan M Hua
(74) *Attorney, Agent, or Firm* — Sughrue Mion, PLLC

(57) ABSTRACT

In a method of resource allocation for mobility management of a user equipment (UE) in a wireless network, a base station (BS) in the wireless network receives a plurality of mobility parameters of the UE, provides a service on an active BWP of a plurality of BWPs to the UE, detects a change in at least one mobility parameter from the plurality of mobility parameters, determines whether a change in the at least one mobility parameter meets a QoS/QCI criterion, and varies the resource allocation for the BWP, in response to detecting that the change in the at least one mobility parameter meets the QoS/QCI criterion. The BS may vary the allocation by triggering a switch from the active BWP to an optimal BWP selected from passive BWPs, by changing a current subcarrier spacing (SCS) of the active BWP to a selected optimal SCS, or by updating the passive BWPs.

11 Claims, 10 Drawing Sheets

(51) Int. Cl.
*H04W 72/0453* (2023.01)
*H04W 72/542* (2023.01)

(58) Field of Classification Search
CPC ....... H04W 16/02; H04W 16/28; H04W 4/30; H04W 4/40; H04W 4/44; H04W 72/23; H04W 8/24; H04W 8/245; H04W 24/08; H04W 28/082; H04W 28/0967; H04W 28/24; H04W 36/06; H04W 74/004; H04W 74/006; H04W 74/0833; H04W 16/10; H04W 48/18; H04W 72/1268; H04W 72/21; H04W 72/542; H04W 72/563; H04W 76/28; H04W 88/02; H04W 88/08; H04W 12/06; H04W 12/08; H04W 16/14; H04W 16/18; H04W 28/0268; H04W 72/541; H04W 76/15; H04W 76/19; H04W 76/27; H04W 88/085
See application file for complete search history.

(56) References Cited

U.S. PATENT DOCUMENTS

2019/0141742 A1* 5/2019 Zhou .................... H04L 5/0064
2019/0261406 A1 8/2019 Kim et al.
2019/0306923 A1* 10/2019 Xiong .................. H04L 27/261
2020/0014512 A1 1/2020 Ramadan et al.
2020/0042905 A1* 2/2020 Gupta ................ G06F 12/0893
2020/0170022 A1* 5/2020 Jones ................ H04W 72/0446
2020/0313831 A1 10/2020 Kim et al.
2020/0336959 A1 10/2020 Wu et al.
2020/0351748 A1 11/2020 Jung et al.
2020/0404690 A1 12/2020 Lee et al.
2021/0176656 A1 6/2021 Sang et al.
2021/0399821 A1 12/2021 Chung et al.
2021/0410017 A1* 12/2021 Caswell ................ H04W 28/20
2022/0217781 A1* 7/2022 Decarreau ............ H04W 24/10

FOREIGN PATENT DOCUMENTS

KR 10-2020-0114871 A 10/2020
WO 2019/066587 A1 4/2019
WO WO-2020064333 A1 * 4/2020 .......... H04W 74/006
WO 2020/091520 A1 5/2020

OTHER PUBLICATIONS

International Search Report (PCT/ISA/210) and Written Opinion (PCT/ISA/237) issued on Aug. 30, 2021 by the International Searching Authority for International Patent Application No. PCT/KR2021/005450.

* cited by examiner

METHOD AND BASE STATION FOR RESOURCE ALLOCATION FOR MOBILITY MANAGEMENT OF USER EQUIPMENT

CROSS-REFERENCE TO RELATED APPLICATIONS

This application is a continuation application of International Application No. PCT/KR2021/005450, filed on Apr. 29, 2021, which is based on and claims priority to India Patent Application No. 202041053554, filed on Dec. 9, 2020 in the Indian Patent Office, the disclosures of each of which are incorporated by reference herein in their entireties.

BACKGROUND

1. Field

The present disclosure relates to wireless communication, and more specifically to a method and a base station for resource allocation for mobility management of a user equipment in a wireless network.

2. Description of Related Art

A user equipment (UE), such as a smartphone or other mobile device with wireless networking functionality, scans a bandwidth assigned to 5G (or other) network systems in order to connect to and access services such as voice call service, data service, video call service, and the like. A battery of the UE drains faster when the UE scans the complete bandwidth. To reduce the drainage of the battery of the UE, the bandwidth is divided into multiple bandwidth parts (BWPs). Each BWP is suitable for specific requirements such as a throughput requirement (e.g. data rate) or a service requirement (e.g. a voice call service) or a power requirement (e.g. a power usage profile) at the UE. Each BWP is a contiguous set of physical resource blocks (PRBs) on a given carrier.

Generally, a UE is configured for a maximum of four BWPs for a downlink and an uplink, but at a given point of time only one or more BWP is/are active for downlink and one or more BWP is/are for uplink. Out of the four BWPs, the UE accesses the service through one BWP or multiple BWPs. The BWPs accessed by the UE for the uplink are termed “active BWPs.”

In a scenario where the UE operates in the active BWP with narrow bandwidth but the throughput requirement is not fulfilled by the active BWP, then the UE informs the connecting BS to enable an appropriate/optimal BWP which satisfies the throughput requirement of the UE. Further, the BS conveys instructions to the UE via radio resource control (RRC), downlink control information (DCI), or medium access channel-control element (MAC-CE) to switch from the active BWP to one of the BWP in passive BWPs. Either before or after switching to passive BWP, the BS can configure the BWPs.

As per conventional methods in the 5G system, the BWP switching for the UE is decided based on the UE, and an expiry of a BWP-inactivity timer. When channel conditions for the UE change drastically, and the UE continues to operate on the active BWP, then the UE encounters higher block error rates (BLERs). By not switching to the optimal BWP, system throughput and a quality of experience (QoE) or quality of service (QoS) at the UE degrades. The UE BLER may be reduced by opting for lower modulation and coding scheme (MCS) value, increasing a frequency of channel quality information (CQI) reporting, or both. However, reducing the MCS value of the UE results in a lower system throughput, which leads to larger packet delays. Moreover, increasing the frequency of reporting the CQI reduces a spectral efficiency and reduces the UE battery efficiency. Hence, there is a need for alternative method or system for reducing the BLER without compromising any of the system throughput, a spectral efficiency, and the UE battery efficiency.

SUMMARY

An objective of the embodiments disclosed herein is to provide a method for BS resource allocation, when the UE is in motion.

Another objective of the embodiments disclosed herein is to determine whether a change in mobility parameters meets QoS/QoS class indicator (QCI) criteria while providing a service on an active BWP to the UE.

Another objective of the embodiments disclosed herein is to select an optimal BWP from passive BWPs at the UE, and trigger a BWP switch from the active BWP to the optimal BWP of the passive BWPs, in response to a determination that the change in the mobility parameters meets the QoS/QCI criteria.

Another objective of the embodiments disclosed herein is to select an optimal subcarrier spacing (SCS) for the active BWP and change a current SCS of the active BWP to the optimal SCS at the UE, in response to a determination that the change in the mobility parameters meets the QoS/QCI criteria.

Another objective of the embodiments disclosed herein is to dynamically change to an appropriate BWP based on mobility and other network and UE parameters.

Another objective of the embodiments disclosed herein is to dynamically update the passive BWPs at the UE, in response to a determination that the change in the mobility parameters meets the QoS/QCI criteria.

Another objective of the embodiments disclosed herein is to reduce BLER without compromising on any of a system throughput, a spectral efficiency, and UE battery efficiency.

Accordingly, the embodiments herein provide a method of resource allocation for mobility management in a wireless network when UEs are in mobility. The method includes receiving, at a BS in the wireless network, a plurality of mobility parameters of a UE in the wireless network. Further, the method includes providing, by the BS, a service on an active BWP of a plurality of BWPs to the UE. Further, the method includes detecting, by the BS, a change in at least one mobility parameter of the plurality of mobility parameters. Further, the method includes detecting, by the BS, whether a change in the at least one mobility parameter meets a QoS/QCI criterion. Further, the method includes varying, by the BS, the resource allocation for the BWP, in response to detecting that the change in the at least one mobility parameter meets the QoS/QCI criterion.

In an embodiment, varying the resource allocation for the BWP may include performing, by the BS, one of: selecting an optimal BWP from set of passive BWPs of the plurality of BWPs, and triggering a BWP switch from the active BWP to the optimal BWP for the UE; selecting an optimal SCS for the active BWP and changing a current SCS of the active BWP to the optimal SCS at the UE; and dynamically updating passive BWPs of the plurality of BWPs at the UE.

In an embodiment, the optimal BWP may be selected in response to determining that a capability of the UE allows switching from the active BWP to the optimal BWP.

In an embodiment, the optimal SCS may be selected in response to determining that a capability of the UE does not allow switching from the active BWP to the optimal BWP and allows to change the current SCS of the active BWP.

In an embodiment, one of the optimal BWP from the passive BWPs of the plurality of BWPs and the optimal SCS for the active BWP may be selected may be selected based on output obtained by inputting the plurality of mobility parameters of the UE to a trained machine learning (ML) or artificial intelligence (AI) model.

In an embodiment, the trained ML model may include a neural network (NN) model trained by inputting the plurality of mobility parameters of the UE, various BS parameters, and a plurality of mobility parameters of other UEs to a plurality of input NN nodes of the NN model, determining an optimal weight of each input NN node based on a training method, and training the NN model based on the optimal weight of each input NN node of the plurality of input NN nodes, the plurality of mobility parameters of the UE, and the plurality of mobility parameters of other UEs.

In an embodiment, the ML or AI model may be trained with real time data obtained from an intelligence layer, which may be in a centralized unit (CU), a distribution unit (DU), or a cloud based architecture. The proposed methods are applicable for all wireless networks irrespective of a technology. Further, the proposed methods can be used for all split options mentioned in 3GPP systems or/and open radio access network (ORAN) systems or/and virtual radio access network (VRAN) systems.

In an embodiment, the ML or AI model may be implemented on per UE or per BS basis. A sub-set of the parameters may be used to train the ML or AI model.

In an embodiment, the plurality of mobility parameters may include at least one of a doppler frequency, a velocity of the UE, a current time, a capability of the UE, an angle of arrival of a signal from the UE, an angle of departure of a signal from the UE, a geographical location of the UE, a BWP configuration of the UE, a traffic in a geographical route traversed by the UE, a density of UEs in the geographical location, a distribution of a traffic load of different services, a BLER requirement of the UE, a QoS of the UE, a QCI of the UE, a long-term/short-term/instantaneous channel characteristics of the UE, a long/short/weighted average of all parameters such as interference and network and UE parameters etc., an intra/inter frequency measurement of the UE, a frequency of operation between the UE and the BS, an identifier of the BS, a type of the BS, a bandwidth parts, a coherence time, a coherence bandwidth, climate conditions in the day, a distribution of UEs associated with the BS, a category of the UEs associated with the BS, a data type information, a maximum transmit power at the BS, a maximum number of neighboring cells of the BS, a number of beams available at the BS, a type of the wireless network, an operating frequency of the neighboring cells of the BS, a system parameter of the neighboring cells of the BS, a timing delay requirement, a number of acknowledgments (ACKs) received from the UE, a number of negative-acknowledgments (NACKs) received from the UE, a distance between the BS and the UE, a signal transmission between the UE relative to the BS, a load requirement of the UE, a service requirement at the UE, a channel quality information (CQI) requirement of an UE, MCS, a latency requirement of the UE, a fading statistic of the UE, a delay spread at the UE, a radio bearer used by the UE and the BS, a logical channel (LCH) used by the BS and the UE, a logical channel group (LCG) used by the BS and the UE, and a Buffer Occupancy (BO) of the BS and the UE.

In an embodiment, the at least one mobility parameter may include at least one of channel conditions, the QCI of the UE, the QoS of the UE, the number of ACKs received from the UE, a number of continuous NACKs received from the UE, a rate of receipt of the NACKs, an infinite impulse response (IIR) average of NACK values that crosses a threshold NACK value, and a number of NACKs obtained in response to a predetermined number of last transmissions received from the UE.

In an embodiment, the method includes indicating by the BS, the change in the active BWP to the optimal BWP at the UE to at least one neighbor BS and to at least one other UE associated with the BS. Changing the BWP or dynamically updating the passive BWPs can occur even when a traffic condition of a user changes. The proposed method is also effective for a scenario with multiple active BWPs.

In an embodiment, the method includes indicating, by the BS, the change in the current SCS of the active BWP to the optimal SCS at the UE to at least one neighbor BS and to at least one other UE associated with the BS.

Accordingly, the embodiments herein provide a BS configured to reallocate resources for mobility management of the UE in the wireless network. The BS includes a resource controller or resource allocation engine, a memory, and at least one processor, where the resource controller is coupled to the memory and the processor. The resource controller is configured to receive the plurality of mobility parameters of the UE, to provide the service on the active BWP of the plurality of BWPs to the UE, to detect the change in at least one mobility parameter from the plurality of mobility parameters, to detect whether the change in the at least one mobility parameter meets the QoS/QCI criterion, and to vary the resource allocation for the BWP, in response to detecting that the change in the at least one mobility parameter meets the QoS/QCI criterion.

These and other aspects of the embodiments herein may be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This method and base station (BS) are illustrated in the accompanying drawings, throughout which like reference letters indicate corresponding parts in the various figures. The embodiments herein may be better understood from the following description with reference to the drawings, in which.

DETAILED DESCRIPTION

Figure 1:
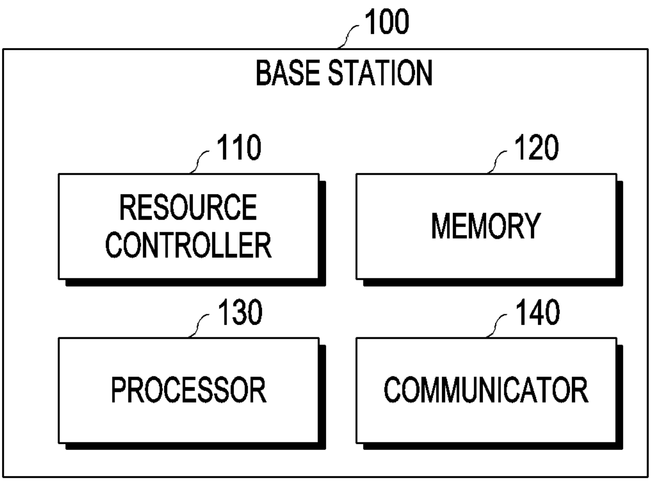
FIG. 1 is a block diagram illustrating a BS configured to allocate resources for mobility management of a UE in a wireless network, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is conventional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor or CPU or GPU based servers (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method of resource allocation for mobility management of a UE in a wireless network. The method includes receiving, at a BS in the wireless network, a plurality of mobility parameters of the UE in the wireless network. Various types of BSs include, but are not limited to, remote radio head (RRH), eNodeB, gNodeB, resource allocation node, ORAN, and macro/micro/smallcell/nano/pico BSs. Modes of operation of the BS include, but are not limited to, full duplex, half duplex, dynamic time division duplex (TDD), frequency division duplex (FDD), non-orthogonal multiple access (NOMA), and non-NOMA.

The method includes providing, by the BS, a service on an active BWP of a plurality of BWPs to the UE. Further, the method includes detecting, by the BS, a change in at least one mobility parameter of the plurality of mobility parameters. Further, the method includes determining, by the BS, whether a change in the at least one mobility parameter meets a QoS/QCI criteria. In response to determining that the change in the at least one mobility parameter meets the QoS/QCI criteria, the method includes performing, by the BS one of: selecting an optimal BWP from passive BWPs of the plurality of BWPs, and triggering a BWP switch from the active BWP to the optimal BWP at the UE; selecting an optimal SCS for the active BWP, and changing a current SCS of the active BWP to the optimal SCS at the UE; and dynamically updating passive BWPs of the plurality of BWPs at the UE.

Unlike existing methods and systems, the proposed method allows the BS to dynamically update the BWP or the SCS at the UE based on the mobility parameters, using a rule based method or a ML/AI based method while maintaining a required QoS/QCI. Further, the UE switches from the active BWP that has lower SCS to one of the passive BWP that has larger SCS, instead of reducing an MCS value or increasing a frequency of CQI reporting. Thus, the method optimizes the resource allocation at the UE, providing a better quality of experience (QoE) to a user.

Because the BLER/QoS/QCI can be maintained and/or reduced in this manner without reducing the MCS value, the proposed method provides a higher throughput at the UE, and a lesser latency at the UE. Because the BLER can be reduced/maintained without increasing the frequency of the CQI reporting, the proposed method also reduces a battery drainage of the UE. Further, the proposed method provides an increase in a spectral efficiency due to the reduced frequency of the CQI reporting/re-transmission, and optimised resource allocation. Further, the UE experiences lesser latency in sending/receiving packet data. Moreover, the proposed method provides a lower packet delay due to a lower number of NACKs and a high adaptability.

Hybrid methods of existing methods and the proposed method are also can be used to achieve the objectives of the disclosure. Further, the hybrid methods can be used as a function of transmission modes.

Referring now to the drawings, certain example embodiments are illustrated. It is noted that the illustrated are not limiting, but are provided as examples for better understanding of the disclosure as a whole.

FIG. 1 is a block diagram illustrating a base station (BS) 100 configured to allocate resources for mobility management of a user equipment (UE) 200 (illustrated, for example, in FIG. 6) in a wireless network, according to an embodiment as disclosed herein. An example wireless network is a cellular network, which will be primarily assumed hereinafter for convenience, although the disclosure is not limited thereto, as the principles disclosed herein are generally applicable to all forms of wireless networks. The wireless network uses time division duplex (TDD) or frequency division duplex (FDD) for downlink-uplink (DL-UL). The terms BS, gNodeB, eNodeB, cell, RRH, and RU can be used interchangeably. Examples for the UE include, but are not limited to, a smart phone, a tablet computer, a personal digital assistance (PDA), an internet of things (IoT), and the like. In an embodiment, the BS 100 includes a resource controller 110, a memory 120, at least one processor 130, and a communicator 140.

The resource controller 110 is configured to receive a plurality of mobility parameters of the UE 200. In an embodiment, the plurality of mobility parameters includes one or more of a doppler frequency, a velocity of the UE 200, a transmission mode, a current time, a capability of the UE 200, an angle of arrival of a signal from the UE 200, an angle of departure of a signal from the UE 200, a geographical location of the UE 200, a BWP configuration of the UE 200, a traffic in a geographical route traversed by the UE 200, a density of UEs in the geographical location, a distribution of a traffic load of different services such as voice, web browsing, video calls etc., a BLER requirement of the UE 200, a QoS of the UE 200, a QCI of the UE 200, a long-term/short-term/instantaneous channel characteristics of the UE 200, a long/short/weighted average of all parameters such as interference etc., an intra/inter frequency measurement of the UE 200, a frequency of operation between the UE 200 and the BS 100, an identifier of the BS 100, a type of the BS 100, a bandwidth parts, a coherence time, a coherence bandwidth, climate conditions in the day, a distribution of UEs associated with the BS 100, a category of the UEs associated with the BS 100, a data type information, a maximum transmit power at the BS 100, a maximum number of neighboring cells of the BS 100, a number of beams available at the BS 100, a type of the wireless network, an operating frequency of the neighboring cells of the BS 100, a system parameter of the neighboring cells of the BS 100, a timing delay requirement, a number of ACKs received from the UE 200, a number of NACKs received from the UE 200, a distance between the BS 100 and the UE 200, a signal transmission between the UE 200 relative to the BS 100, a load requirement of the UE 200, a service requirement at the UE 200, a CQI requirement of the UE 200, a latency requirement of the UE 200, a fading statistic of the UE 200, a delay spread at the UE 200, a radio bearer used by the UE 200 and the BS 100, a LCH used by the BS 100 and the UE 200, a LCG used by the BS 100 and the UE 200, and a BO of the BS 100 and the UE 200.

The coherence time is a time period over which channel characteristics are approximately same. The coherence bandwidth is a distribution of power over the time period. The load requirement of the UE 200 indicates a distribution of a load of the different services like the voice, the web browsing, the video call etc. The delay spread is a measure of multipath propagation.

A range/example of the mobility parameters is given in Table 1.

TABLE 1

| Mobility parameters | Range/Example |
|---|---|
| Doppler frequency | For example, 249.3 Hz, 226.7 Hz depends on UE velocity and distance from BS, frequency of band. |
| Velocity of the UE | 0 to 500 kmph depends on technology |
| Time | 00:00:00 to 23:59:59 |
| Capability of the UE | UE Cat 1-19, NB-IoT, Cat-M1, Number of UE antennas; 1-32; MIMO capabilities; tx/rx modes |
| Angle of arrival of signal from the UE | 0 to 360 degrees |
| Angle of departure of a signal from the UE | 0 to 360 degrees |
| BWP configuration | I to N(BWPs, N can be any number depends on technology) |
| BLER requirement | For example 0.1%, to 10%(operator specific, configurable parameter) |
| Frequency of operation | 700 MHZ to 80 GHz |
| Coberence time | Few microseconds to milliseconds |
| | For example, 500 μs and 35 μs when the system is deployed at the carrier frequencies 2 and 28 GHz, respectively |
| | For example, coherence time: 0.66 ms, 1.90 ms, 15.23 ms for Doppler spread of 648, 222, 27 respectively |
| Coherence bandwidth | For example 15 kHz-480 kHz for 5G, 15 KHz for 4G |
| Timing delay requirement | For example it can be 10 ms to 300 ms( Based on QCI parameters) |
| Number of ACKs received from the UE | Configurable parameter |
| Number of NACKs received from the UE | Configurable parameter |
| Distance between BS and UE | Distance in the range of Kilometers |
| Service requirement | Web, Video, Voice, SMS etc |
| CQI requirement | 0 to N(where N: 0 10 15 for 4G, 31 for 5G) |
| Latency requirement | Upto 10 ms for 4G, less than or equal to 1 ms in 5G, configurable parameter based on service type. |
| Delay spread | In the order of 0, 1 ms to X1 ms depends on wireless channel parameters |
| LCH | 16 for 4G and 32 for 5G |
| LCG | 4 for 4G and 8 for 5G |
| Identifier of the BS | 0 to 1007 |
| Type of the BS | macro/micro/nano/pico/smallcell/wi-fi/TDD/FDD |
| Frequency of operation, and respective bandwidth parts | 700 MHz to 80 GHz |
| Day details | 1 to 365 (1st Jan to 31st Dec) |

TABLE 1-continued

| Mobility parameters | Range/Example |
|---|---|
| Geographical location | Latitude: [−90 to 90]<br>Longitude: [−180 to 180] |
| Density of the UE in the geographical location | 0 to 1000 users per location |
| Distribution of the traffic | Poisson distribution with mu = 1/sec |
| Climate conditions | temperature: −20 to 60 degree Celsius<br>rain: 0 to 150 mm<br>fog density: 5 to 50 μm |
| Distribution of UEs | 0 to 200 users/square kilometre |
| UE information | Number of DE antennas: 1-32: MIMO capabilities; tx/tx modes |
| Category of UE | NB-IOT, M1, 1 to 19 category |
| Data type information | GBR/Non-GBR information |
| Intra/inter frequency measurement | 700 MHz to 90 GHz |
| QoS | 0 to 255 |
| QCI | 0 to 78 |
| Maximum BS/cell/Enb/beam transmit power | 20 db to 48 db in case of ON. It can be turned off as well |
| Maximum number of neighboring cells | 1000 |
| Number of beams | 256 |
| Type of wireless network | Heterogenous/Homogenous |
| Operating frequencies of neighbouring. cells | 700 MHZ to 80 GHz/frequency re-use information |
| System parameters of neighbouring cells | Coverage area/Coverage holes/number of neighbouring cells antennas etc |

The resource controller 110 is configured to provide a service on an active BWP of a plurality of BWPs to the UE 200. Examples for the service include, but are not limited to, a voice call service, a data service, a video call service, a voicemail box service, and the like. The service is provided by an operator of the wireless network. The active BWP is a BWP through which the UE 200 is allowed to use the service. The resource controller 110 is configured to detect a change in at least one mobility parameter from the plurality of mobility parameters. In an embodiment, the at least one mobility parameter includes one or more of channel conditions, the QCI of the UE 200, the QoS of the UE 200, the number of ACKs received from the UE 200, a number of continuous NACKs received from the UE 200, a rate of receipt of the NACKs, an IIR average of NACK values that crosses a threshold NACK value, a number of NACKs obtained in response to a predetermined number of last transmissions received from the UE 200, the capability of the UE 200, a power saving mode, an application/service(s), a latency requirements, a clock rate, and base band processing limitations.

In an embodiment, the channel conditions include the CQI, the delay spread, the doppler, measurements, etc. Further, the resource controller 110 is configured to detect whether a change in the at least one mobility parameter meets one or more QoS/QCI criteria. The clock rate depends on a hardware equipment or a processor speed, and examples include but are not limited to are 2.4 GHz, 3.6 GHz, etc. The base band processing limitations may include one or more of a processing speed, a memory, a number of cycles, a clock rate, a processing time, and a resource.

In an embodiment, the method is a "rule based method." For the purposes of this disclosure, a "rule based method" is a method wherein it is determined whether the QoS/QCI criteria are met based on a threshold value of at least one mobility parameter out of the plurality of mobility parameters. As an example, consider a threshold value of 45 kHz for the doppler frequency, and a threshold value of 120 degrees for the angle of arrival of the signal from the UE 200. A QoS/QCI criterion may thereby be defined as "Has the change in the doppler frequency and the change in the angle of arrival of the signal from the UE 200 reached or crossed 45 kHz and 120 degrees respectively, due to motion of the UE 200?" When the change in the doppler frequency and the change in the angle of arrival of the signal from the UE 200 reach 45 kHz and 120 degrees respectively, due to the motion of the UE 200, then the resource controller 110 is configured to determine that the change in the doppler frequency and the angle of arrival of the signal from the UE 200 together meet the QoS/QCI criteria.

In another embodiment, the method is a "machine learning (ML) based method." For the purposes of this disclosure, an "ML based method" is a method wherein it is determined whether the QoS/QCI criteria are met based on output obtained from a trained machine learning (ML) model for the various inputs. While the term "machine learning model" or "ML model" will be used herein for convenience, other forms of artificial intelligence (AI) models may be substituted without departing from the scope of the disclosure.

In an embodiment, the resource controller 110 is configured to select an optimal BWP from the passive BWPs of the plurality of BWPs, in response to detecting that the change in the at least one mobility parameter meets the QoS/QCI criteria. In an embodiment, the resource controller 110 is configured to select the optimal BWP from the passive BWPs in response to determining that the UE 200 is capable to switch from the active BWP to the optimal BWP. In an embodiment, the resource controller 110 is configured to select the optimal BWP from the passive BWPs of the plurality of BWPs based on an output obtained from inputting the plurality of mobility parameters of the UE 200 to a trained ML model. In an embodiment, the ML model is a neural network (NN) model.

An "optimal BWP" is defined as a BWP through which the UE 200 can access the service uninterruptedly while a UE 200 is in motion. In an example scenario, twenty BWPs are available at the BS 100. Out of the twenty BWPs, the BS 100 allocates four BWPs to the UE 200 for accessing the service. Out of four BWPs, the UE 200 uses one BWP (a designated active BWP) at a time to access the service. The remaining three BWPs out of the four allocated BWPs are designated as the passive BWPs. In this example scenario, the resource controller 110 is configured to trigger a BWP switch at the UE 200 from the active BWP to an optimal BWP of one of the three passive BWPs. In response to triggering the BWP switch, the UE 200 switches the active BWP to a passive BWP, and activates the optimal BWP in the passive BWPs. Further, the UE 200 continues to access the service, now through the optimal BWP. In an embodiment, the resource controller 110 is configured to indicate the change in the active BWP to the optimal BWP at the UE 200 to at least one neighbor BSs and to other UEs associated with the BS 100. Changing the BWP or dynamically updating the passive BWPs may occur even when a traffic condition of a user changes. The proposed method is also effective for a scenario having multiple active BWPs.

In another embodiment, the resource controller 110 is configured to select an optimal SCS for the active BWP, in response to determining that the change in the at least one mobility parameter meets the QoS/QCI criteria. Each SCS in each BWP ranges from 0 to 5. In an embodiment, the resource controller 110 is configured to select the optimal SCS for the active BWP in response to determining that the UE 200 is not capable to switch from the active BWP to the optimal BWP but is capable to change the current SCS of the active BWP. In an embodiment, the resource controller 110 is configured to select the optimal SCS for the active BWP based on an output obtained from inputting the plurality of mobility parameters of the UE 200 to the ML model. The resource controller 110 is configured to change a current SCS of the active BWP to the optimal SCS at the UE 200. Further, the UE 200 continues to access the service through the active BWP using the optimal SCS. In an embodiment, the resource controller 110 is configured to indicate the change in the current SCS of the active BWP to the optimal SCS at the UE 200 to the at least one neighbor BSs and the other UEs associated with the BS 100.

In another embodiment, the resource controller 110 is configured to dynamically update the passive BWPs of the plurality of BWPs at the UE 200, in response to determining that the change in the at least one mobility parameter meets the QoS/QCI criteria. In an embodiment, the passive BWPs at the UE 200 are updated, in response to determining that the UE 200 is not capable to switch from the active BWP to the optimal BWP and not capable to change the current SCS of the active BWP. In an embodiment, the passive BWPs at the UE 200 is dynamically updated based on an output from inputting the plurality of mobility parameters of the UE 200 to the ML model. In an embodiment, the resource controller 110 is configured to determine at least one optimal passive BWP from the plurality of BWPs based on the at least one mobility parameter. Further, the resource controller 110 is configured to update the passive BWPs at the UE 200 with the at least one optimal passive BWP. Further, the resource controller 110 is configured to trigger the BWP switch from the active BWP to one of the optimal passive BWPs at the UE 200. In response to triggering the BWP switch, the UE 200 switches from the active BWP to a selected one of the optimal passive BWPs and activates the selected optimal passive BWPs. Further, the UE 200 continues to access the service through the updated passive BWP.

In an embodiment, the resource controller 110 is configured to apply a reinforcement learning method to the output obtained from the ML model to improve BLER performance of the BS 100. In an embodiment, the capability of the UE 200 is determined using the plurality of parameters by applying the rule based method or the ML based method.

In another embodiment, the resource controller 110 is configured to create a Markov chain based on the long or short term stats (e.g., network parameters, UE parameters, and/or mobility parameters). Further, the resource controller 110 is configured to predict at least one of: the optimal BWP from the passive BWPs, the optimal SCS, and the dynamically update of the passive BWPs using the Markov chain. A transition probability matrix of the Markov chain can be dynamically updated.

The memory 120 may include non-volatile storage elements. Examples of such non-volatile storage elements may include magnetic hard discs, optical discs, floppy discs, flash memories, or forms of an electrically programmable memory (EPROM) or an electrically erasable and programmable memory (EEPROM).

In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store information more efficiently, using various suitable methods. In certain examples, a non-transitory storage medium may store data that can, over time, change (e.g., in random access memory (RAM) or cache).

The processor 130 is configured to execute instructions stored in the memory 120. The communicator 140 is configured to communicate internally between hardware components in the BS 100. Further, the communicator 140 is configured to facilitate the communication between the BS 100 and other devices in the wireless network.

FIG. 1 illustrates particular hardware components of the BS 100 but it is to be understood that other embodiments are not limited thereon. In other embodiments, the BS 100 may include less or more components. Further, the labels or names of the components are used only for illustrative purposes and do not limit the scope of the disclosure. One or more components can be combined together to perform same or a substantially similar function for allocating the resource for the mobility management of the UE 200.

In an embodiment, a Cloud Radio Access Network (CRAN) or a VRAN or the ORAN of the wireless network includes the resource controller 110 to dynamically update the BWPs and the SCS.

Figure 2:
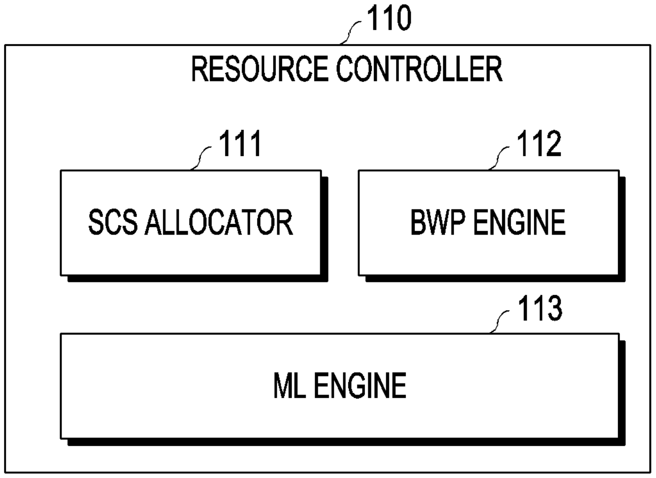
FIG. 2 is a block diagram illustrating a resource controller of the BS configured to allocate resources for the mobility management of the UE in the wireless network, according to an embodiment as disclosed herein.

FIG. 2 is a block diagram illustrating the resource controller 110 of the BS 100 configured to allocate resources for the mobility management of the UE 200 in the wireless network, according to an embodiment as disclosed herein. In an embodiment, the resource controller 110 includes a SCS allocator 111, a BWP engine 112 and a ML engine 113. The BWP engine 112 receives the plurality of mobility parameters of the UE 200. The BWP engine 112 provides the service on the active BWP from the plurality of BWPs to the UE 200. The BWP engine 112 detects the change in the at least one mobility parameter from the plurality of mobility parameters. Further, the BWP engine 112 detects whether the change in the at least one mobility parameter meets the QoS/QCI criteria. The BWP engine 112 triggers the BWP switch from the active BWP to the optimal BWP at the UE 200. In an embodiment, the BWP engine 112 indicates the change in the active BWP to the optimal BWP at the UE 200 to at least one neighbor BSs and the other UEs associated with the BS 100.

The SCS allocator 111 selects the optimal SCS for the active BWP, in response to determining that the change in the at least one mobility parameter meets the QoS/QCI criteria. The SCS allocator 111 changes the current SCS of the active BWP to the optimal SCS at the UE 200. In an embodiment, the SCS allocator 111 indicates the change in the current SCS of the active BWP to the optimal SCS at the UE 200 to the at least one neighbor BSs/beams and the other UEs associated with the BS 100.

In another embodiment, the BWP engine 112 dynamically updates the passive BWPs of the plurality of BWPs at the UE 200, in response to determining that the change in the at least one mobility parameter meets the QoS/QCI criteria. In another embodiment, the BWP engine 112 determines the at least one optimal passive BWPs from the plurality of BWPs based on the at least one mobility parameter. Further, the BWP engine 112 updates the passive BWPs at the UE 200 with the at least one optimal passive BWPs. Further, the BWP engine 112 triggers the BWP switch from the active BWP to one of the optimal passive BWPs at the UE 200.

In an embodiment, the ML engine 113 inputs the plurality of mobility parameters of the UE 200 and a plurality of mobility parameters of other UEs to a plurality of input NN nodes of the NN model. Further, the ML engine 113 determines an optimal weight of each input NN node based on a training method. Further, the ML engine 113 trains the NN model based on the optimal weight of each input NN node of the plurality of input NN nodes, the plurality of mobility parameters of the UE 200 and the plurality of mobility parameters of other UEs. In an embodiment, a hybrid or cascaded method can be used to train the NN model to obtain an optimal or sub-optimal or near optimal output.

A UE battery level, a UE manufacturing company, components manufacturing company details, and various activation functions and/or approximated activation functions, can be used as an input to the NN model. Suitable architectures for the NN model include, but are not limited to, a Dense NN, a Sparse NN, a Recursive NN, a Sparse Recursive NN, a Convolutional NN, a Sparse Convolutional NN, a Reinforcement Learning NN, a Deep Learning NN, and a Deep Queue Learning NN.

In another embodiment, the weights of each node of the NN model are updated based on the back-propagation or a steepest gradient based methods. The weights of each node of the NN model may be a function of the input parameters (i.e. plurality of mobility parameters) and training data. This training can be done either online or offline, or a hybrid of online and offline. Learning from the NN model can be used as a formula or rule based mechanisms or rule base policies or schemes, which can be used in offline training. In an embodiment, the NN model is located in the UE 200, which may include an on-device module to host ML models.

In an embodiment, the ML engine 113 inputs the plurality of mobility parameters of the UE 200 to the ML model, to select the optimal BWP from the passive BWPs. In an embodiment, the ML engine 113 inputs the plurality of mobility parameters of the UE 200 to the ML model, to select the optimal SCS for the active BWP. In an embodiment, the ML engine 113 inputs the plurality of mobility parameters of the UE 200 to the ML model, to dynamically update the passive BWPs at the UE 200. In an embodiment, the ML engine 113 applies the reinforcement method to output obtained from the ML model to improve the performance of the BS 100.

In an embodiment, the ML model is trained with real time data obtained from an intelligence layer, where the intelligence layer can be in a CU or a DU or a cloud based architecture. The proposed methods are applicable for all wireless networks irrespective of a technology. Further, the proposed methods can be used for all split options mentioned in 3GPP systems or/and ORAN systems or/and VRAN systems. In an embodiment, the ML/AI model is implemented on per UE or per BS basis. A sub-set of the parameters can be used to train the ML model.

At least one of the plurality of modules may be implemented through the ML engine 113. A function associated with ML may be performed through the memory 120, and the processor 130.

The at least one processor 130 may include one or a plurality of processors. Suitable types of processors include, though are not limited to: a general-purpose processor, such as a central processing unit (CPU), an Application processor (AP), or the like; a graphics-only processing unit or other graphics processing unit (GPU); a visual processing unit (VPU); and an AI-dedicated processor such as a neural processing unit (NPU).

In an embodiment, the at least one processor 130 controls processing of the input data in accordance with a predefined operating rule or ML engine 113 stored in the memory 120. The predefined operating rule or ML engine 113 is provided through training or learning.

For the purposes of this disclosure, the phrase "provided through learning" is meant to indicate that, by applying a learning method to a plurality of learning data, a predefined operating rule or ML engine 113 of a desired characteristic is made. The learning may be performed in the BS 100 itself in which the ML will operate or is operating, or may be implemented through a separate server/system.

The ML engine 113 may consist of a plurality of NN layers. Each layer has a plurality of weight values, and performs a layer operation through calculation of a previous layer and an operation of a plurality of weights. Examples of neural networks include, but are not limited to, convolutional neural network (CNN), dense neural network, deep neural network (DNN), recurrent neural network (RNN), restricted Boltzmann machine (RBM), deep belief network (DBN), bidirectional recurrent deep neural network (BRDNN), generative adversarial networks (GAN), and deep Q-networks.

The learning method is a method for training a predetermined target device (for example, the BS 100) using a plurality of learning data to cause, allow, or control the target device to make a determination or prediction. Examples of learning methods include, but are not limited to, supervised learning, unsupervised learning, semi-supervised learning, and reinforcement learning.

The diagrams mentioned in the figures are for illustration purposes. Instead of the DNN, the CNN, the RNN and a sparse DNN/CNN/RNN can be used. It is possible to use various activation functions, approximation of activation functions and/or linear approximation of activation functions.

One can also intelligently remove the connections in the NN if the weight of a link is negligible and again can retrain the NN to achieve an expected performance. In case, if the performance does not meet a requirement, it is possible to go back to the earlier NN. One can use ML/AI model to improve the performance of these methods. An expert in the field of disclosure can easily do slight modifications to the proposed solutions. These methods can run in ML module or can run in hardware (HW) or software (SW), where this SW can be on device SW. It can also possible to use HASH or lookup table kind of mechanisms. These can be created by the BS 100 and may be informed to the UE 200. In an embodiment, the UE 200 itself can create these tables.

FIG. 2 illustrates particular hardware components of the resource controller 110, but it is to be understood that other embodiments are not limited thereon. In other embodiments, the resource controller 110 may include less or more components. Further, the labels or names of the components are used only for illustrative purpose and do not limit the scope of the disclosure. One or more components can be combined together to perform the same or a substantially similar function for triggering the BWP switch or changing the current SCS or updating the passive BWPs.

Figure 3:
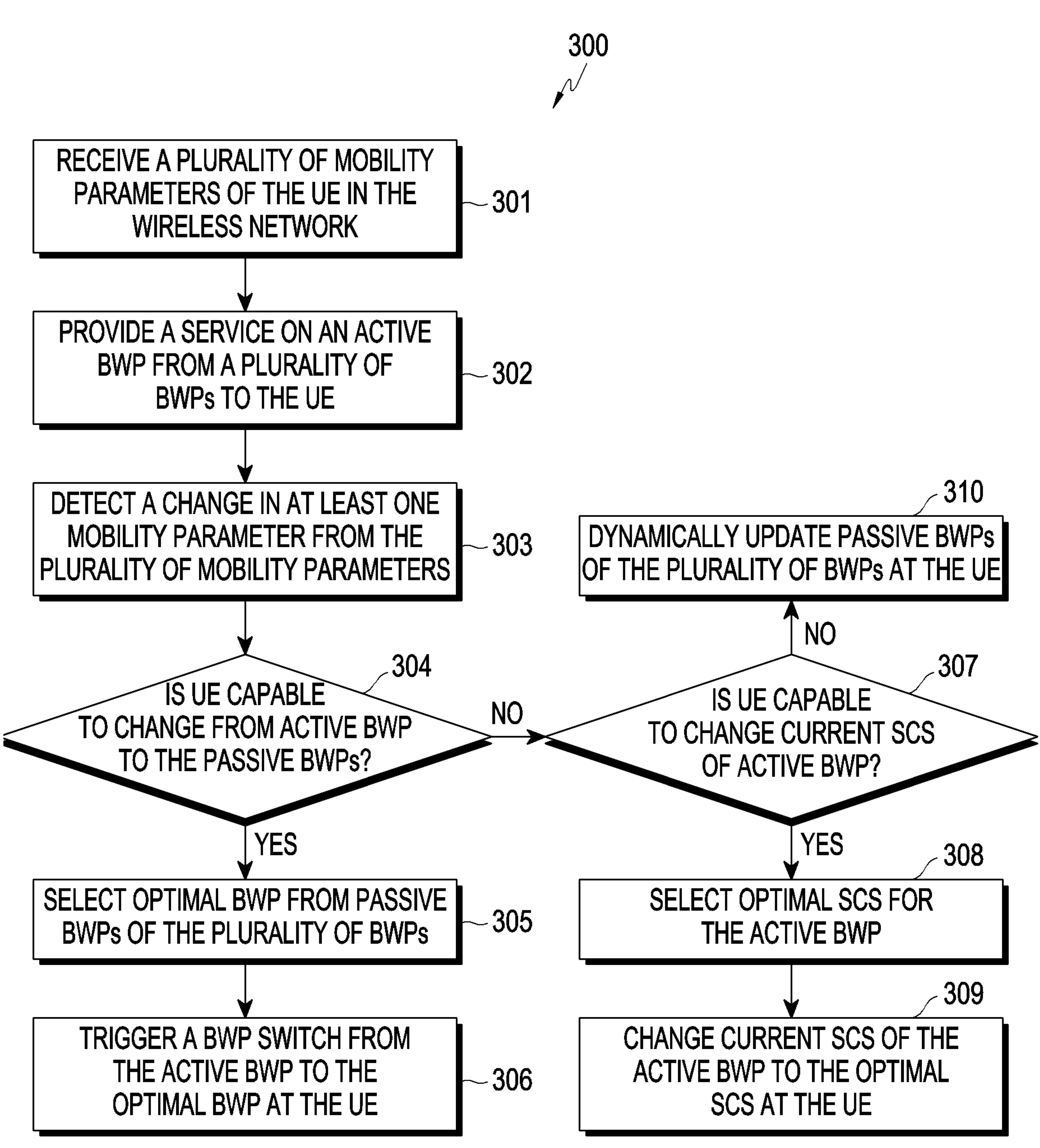
FIG. 3 is a flow diagram illustrating a method of resource allocation for the mobility management of the UE, according to an embodiment as disclosed herein.

FIG. 3 is a flow diagram illustrating a method 300 of resource allocation for the mobility management of the UE 200, according to an embodiment as disclosed herein.

At 301, the method includes receiving the plurality of mobility parameters of the UE 200 in the wireless network. In an embodiment, the method allows the BWP engine 112 to receive the plurality of mobility parameters of the UE 200 in the wireless network. At 302, the method includes providing the service on the active BWP from the plurality of BWPs to the UE 200. In an embodiment, the method allows the BWP engine 112 to provide the service on the active BWP from the plurality of BWPs to the UE 200. At 303, the method includes detecting the change in the at least one mobility parameter from the plurality of mobility parameters of the UE 200. In an embodiment, the method allows the BWP engine 112 to detect the change in the at least one mobility parameter from the plurality of mobility parameters of the UE 200.

At 304, the method includes determining whether the UE 200 is capable to change from the active BWP to the passive BWPs. In an embodiment, the method allows the BWP engine 112 or the ML engine 113 to determine whether the UE 200 is capable to change from the active BWP to the passive BWPs. If the UE is capable to change from the active BWP to passive BWP, then the method proceeds to 305. At 305, the method includes selecting the optimal BWP from the passive BWPs of the plurality of BWPs, in response to determining that the UE 200 is capable to change from the active BWP to the passive BWPs. In an embodiment, the method allows the BWP engine 112 or the ML engine 113 to select the optimal BWP from the passive BWPs of the plurality of BWPs, in response to determining that the UE 200 is capable to change from the active BWP to the passive BWPs. At 306, the method includes triggering the BWP switch from the active BWP to the optimal BWP at the UE 200. In an embodiment, the method allows the BWP engine 112 to trigger the BWP switch from the active BWP to the optimal BWP at the UE 200.

If the UE is not capable to change from the active BWP to passive BWP, the method proceeds to 307. At 307, the method includes determining whether the UE 200 is capable to change from the current SCS of the active BWP, in response to determining that the UE 200 is not capable to change from the active BWP to the passive BWPs. In an embodiment, the method allows the SCS allocator 111 or the ML engine 113 to determine whether the UE 200 is capable to change the current SCS of the active BWP, in response to determining that the UE 200 is not capable to change from the active BWP to the passive BWPs. At 308, the method includes selecting the optimal SCS for the active BWP, in response to determining, at 307, that the UE 200 is capable to change from the current SCS of the active BWP. In an embodiment, the method allows the SCS allocator 111 or the ML engine 113 to select the optimal SCS for the active BWP, in response to determining that the UE 200 is capable to change the current SCS of the active BWP.

At 309, the method includes changing the current SCS of the active BWP to the optimal SCS at the UE 200. In an embodiment, the method allows the SCS allocator 111 to change the current SCS of the active BWP to the optimal SCS at the UE 200. At 310, the method includes dynamically updating the passive BWPs of the plurality of BWPs at the UE 200, in response to determining that the UE 200 is not capable to change from the current SCS of the active BWP. In an embodiment, the method allows the BWP engine 112 to dynamically update the passive BWPs of the plurality of BWPs at the UE 200, in response to determining that the UE 200 is not capable to change the current SCS of the active BWP.

The various actions, acts, blocks, operations, or the like in the method 300 illustrated in FIG. 3 may be performed in the order presented, in a different order or simultaneously. Further, in some embodiments, some of the actions, acts, blocks, operations, or the like may be omitted, added, modified, skipped, or the like without departing from the scope of the disclosure.

Figure 4:
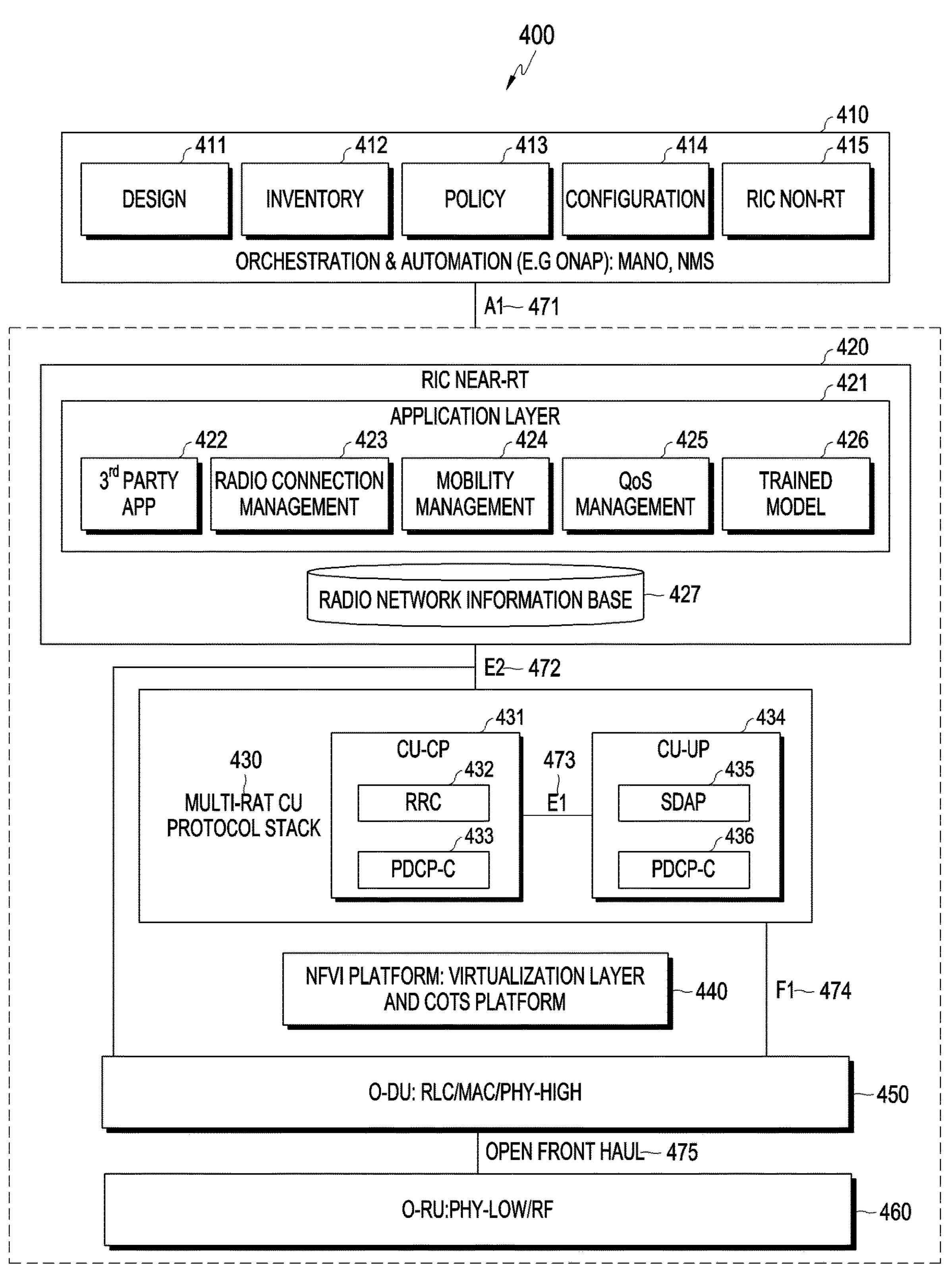
FIG. 4 is an architecture diagram illustrating an open radio access network configured to allocate the resource for the mobility management of the UE, according to an embodiment as disclosed herein.

FIG. 4 is an architecture diagram illustrating an ORAN 400 configured to allocate the resource for the mobility management of the UE 200, according to an embodiment as disclosed herein. In an embodiment, the ORAN 400 includes a orchestration and automation (ONAP) 410, a RAN intelligent controller (MC) near-real time (near-RT) unit 420, a multi-RAT CU protocol stack 430, an NFVI platform 440, an O-DU 450, and an O-RU 460. The ONAP 410 includes a design unit 411, an inventory unit 412, a policy unit 413, a configuration unit 414, and an RIC non-RT unit 415. The RAN intelligent controller (MC) near-real time (near-RT) unit 420 includes an application layer 421 and a radio network information base 427. The application layer 421 includes a 3$^{rd}$ party application 422, a radio connection management unit 423, a mobility management unit 424, a QoS management unit 425, and a trained model 426. The multi-RAT CU protocol stack 430 includes a CU-CP 431 and a CU-UP 434. The CU-CP 431 includes an RRC 432 and a PDCP-C 433. The CU-UP 434 includes an SDAP 435 and a PDCP-C 436.

In the ORAN 400 illustrated in FIG. 4, the ML engine 113 is implemented inside a trained model 426 of an RIC near-RT unit 420 of the ORAN 400. The ML engine 113 estimates the optimal SCS of the active BWP and/or switching the active BWP. Further, the ML engine 113 conveys information regarding switching the active BWP and changing the current SCS to medium access channel/radio resource control (MAC) layer 450/RRC layer 432 layers of the ORAN 400 via an E2 interface 472. The MAC layer 450 uses the information regarding BWP switching of the UE 200 from the active BWP to the optimal BWP, and changing the current SCS for allocating the resources to the UE 200 using a distribution unit (DU). Using the estimated information, the MAC layer 450 can give grants without asking the UE 200. In an embodiment, the ML engine 113 triggers dynamic updating of the passive BWPs. In an embodiment, a radio connection management unit 423, a mobility management unit 424, and a QoS management unit 425 of the ORAN 400 use feedbacks from the ML engine 113 to improve overall performance of the ORAN 400. Similar to the ORAN 400, the proposed method can be implemented on the VRAN, the Cloud RAN, a centralized RAN, and any cloud based RAN for allocating the resource for the mobility management of the UE 200. A centralized controller and a ML/Artificial Intelligence module is included in all the RAN architectures, where each RAN architecture have different interfaces.

Figure 5:
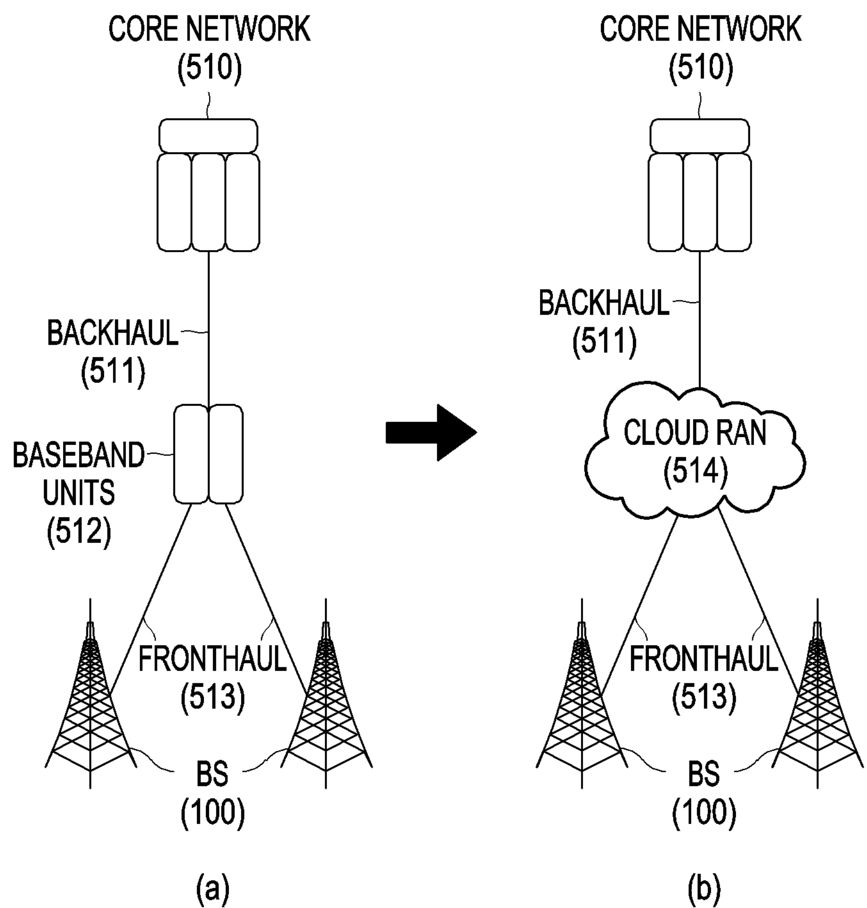
FIG. 5 is an architecture diagram illustrating two network configurations using, respectively, baseband units and a cloud radio access network each configured to allocate the resource for the mobility management of the UE, according to an embodiment as disclosed herein.

FIG. 5 is an architecture diagram illustrating two network configurations using, respectively, baseband units 512 and a CRAN 514 each configured to allocate the resource for the mobility management of the UE 200, according to embodiments as disclosed herein.

For a configuration (a), baseband units 512 are linked to a core network 510 using a backhaul 511. Further, the baseband units 512 are linked to BSs 100 using a fronthaul 513.

For a configuration (b), in contrast, a CRAN 514 is linked to the core network 510 using the backhaul 511. The CRAN 514 may be a centralized cloud RAN with a network function virtualization (NFV). The CRAN 514 is linked to the BSs 100 using the fronthaul 513. The core functions of the core network 510 are co-located with the CRAN 514. The ML engine 113 is implemented in the CRAN 514 to allocate the resource to the UE 200. The NN model in the ML engine 113 learns the weights of the nodes of the NN model using belief propagation. After an NN training phase, the NN model estimates the optimal SCS of the active BWP and/or optimal switching of the active BWP. Further, the ML engine 113 conveys information regarding switching the active BWP and changing the current SCS to the MAC layer 450/RRC layer 432 via 3GPP specified or proprietary interface. The MAC layer 450 uses the information regarding switching the active BWP and changing the current SCS for allocating the resources to the UE 200 using the DU.

Figure 6:
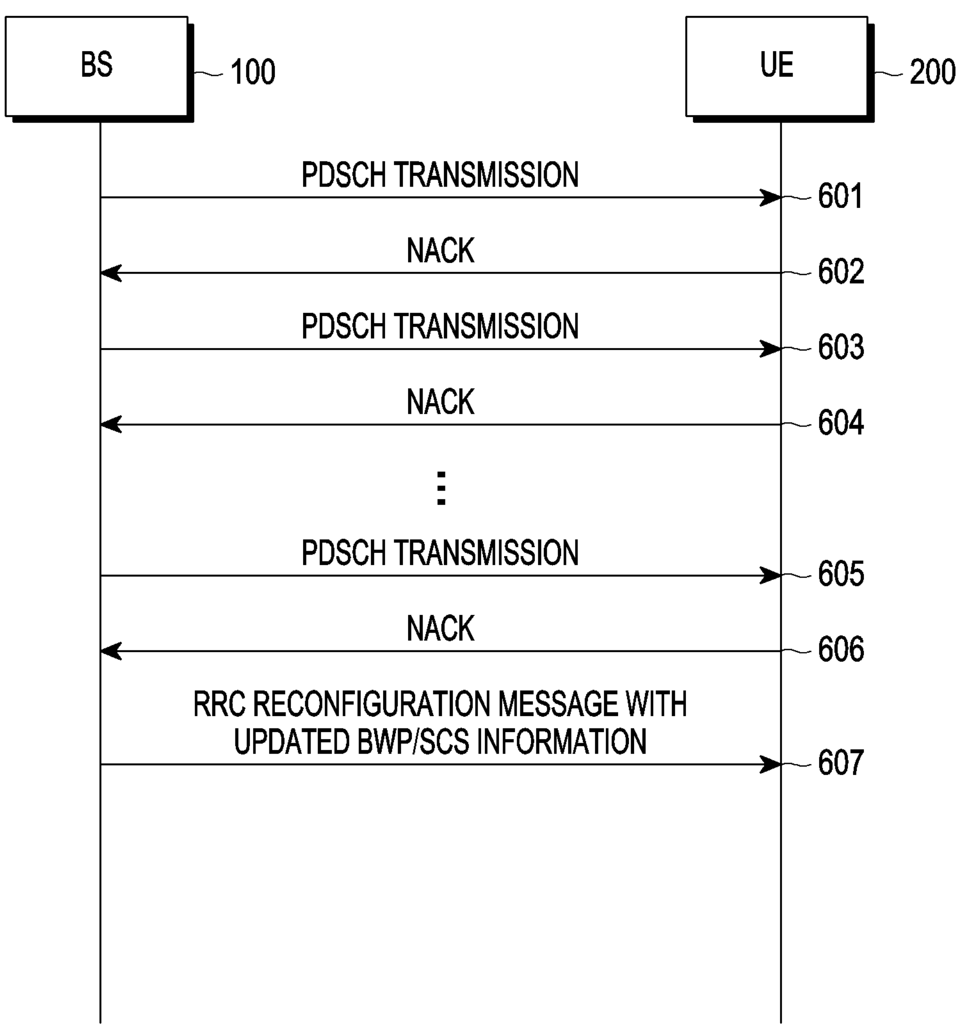
FIG. 6 is a sequential diagram illustrating signaling between the BS and the UE to detect a necessity of updating a BWP/SCS and indicate the UE about updating the BWP/SCS through a radio resource control reconfiguration message, according to an embodiment as disclosed herein.

FIG. 6 is a sequential diagram illustrating signaling between the BS 100 and the UE 200 to detect a necessity of updating the BWP/SCS and indicate the UE 200 about updating the BWP/SCS through an RRC reconfiguration message, according to an embodiment as disclosed herein.

In an embodiment such as illustrated in FIG. 6, the BS 100 signals a physical downlink shared channel (PDSCH) transmission to the UE 200 at 601. Further, the BS 100 receives NACKs for the PDSCH transmission from the UE 200 at 602. In an embodiment, the BS 100 determines that the update of the BWP/SCS is necessary for the UE 200, in response to observing 'M' continuous NACKs at 604 and 606 each in response to corresponding PDSCH transmissions at 603 and 605, for a predetermined number M, and further observing that the doppler frequency value is higher than a threshold doppler frequency value. In another embodiment, the BS 100 determines that the update of the BWP/SCS is necessary for the UE 200, in response to observing 'M' number of NACKs obtained in response to a last 'K' PDSCH transmissions, for a predetermined number K>M, and further observing that the doppler frequency value is higher than the threshold value. In another embodiment, the ML engine 113 of the BS 100 learns from NACK statistics (i.e. a number and a pattern of NACKs received) of other UEs, which may more specifically be UEs with channel conditions similar to the UE 200. Further, the ML engine 113 determines whether to change the BWP and/or change the SCS of the active BWP. The BS 100 signals the RRC reconfiguration message includes the updated BWP/SCS information to the UE 200 at 607, in response to determining that the update of the BWP/SCS is necessary for the UE 200. Further, the UE 200 can update the BWP/SCS based on the BWP/SCS information.

In an embodiment, the ML engine 113 is implemented in the DU of a 5G base station (i.e. gNodeB) for configuring the computed BWP to the UE 200 through the RRC signalling. The DU informs a centralized unit (CU) via F1-C interface (e.g. F1AP UE Context Modification Required message) for configuring the computed BWP to the UE 200 through the RRC signaling by changing an interface (IF) in F1.

In another embodiment, the ML engine 113 is implemented in a radio access network intelligent controller (RIC) for configuring the computed BWP to the UE 200 through the RRC signalling. The DU sends required inputs (i.e. mobility parameters) to the ML engine 113 in the RIC using the E2 application protocol (E2AP) MC indication message through E2 service model (E2SM) containers. Further, the DU updates the computed BWP to the CU through the E2SM container, which causes to trigger the RRC signalling.

Figure 7:
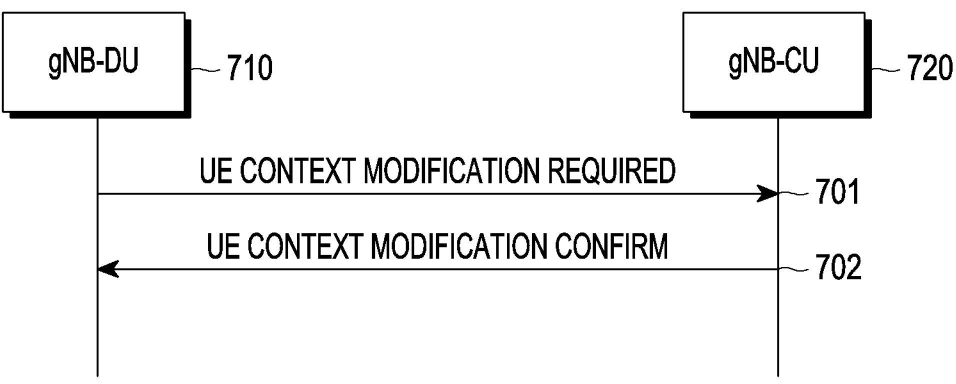
FIG. 7 is a sequential diagram illustrating signaling between a distribution unit and a control unit of the BS to determine the optimal BWP for the UE, according to an embodiment as disclosed herein.

FIG. 7 is a sequential diagram illustrating signaling between the DU 710 and the CU 720 of the BS 100 to determine the optimal BWP for the UE 200, according to an embodiment as disclosed herein.

In an embodiment such as illustrated in FIG. 7, the MAC layer 450 re-computes the optimal BWP and informs the DU 710 for triggering the RRC signalling. Further, the DU 710 informs the CU 720 the optimal BWP by sending the UE context modification required message at 701. Further, the CU 720 acknowledges to the DU 710 by sending a UE context modification confirm message at 702. Further, the CU 720 signals the RRC reconfiguration message to UE 200 for switching to the optimal BWP.

Figure 8:
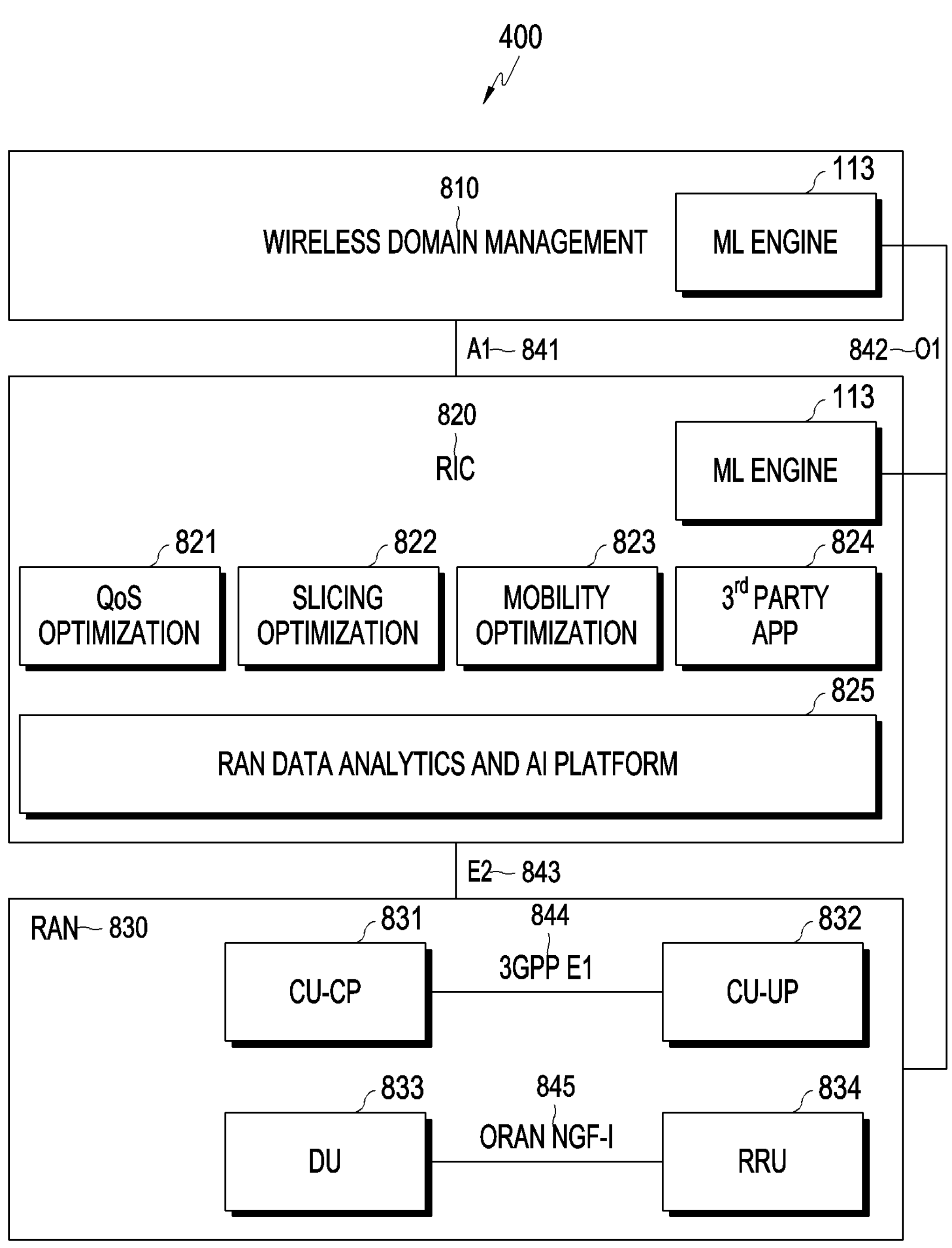
FIG. 8 is an architecture diagram illustrating the open radio access network including a ML engine for allocating the resource for the mobility management of the UE, according to an embodiment as disclosed herein.

FIG. 8 is an architecture diagram illustrating the ORAN 400 including the ML engine 113 for allocating the resource for the mobility management of the UE 200, according to an embodiment as disclosed herein. In an embodiment, the ORAN 400 includes a wireless domain management unit 810 including an ML engine 113, a MC 820, and a RAN 830. The RIC 820 includes an ML engine 113, a QoS optimization unit 821, a slicing optimization unit 822, a mobility optimization unit 823, a $3^{rd}$ party application 824, and a RAN data analytics and AI platform 825. The RAN 830 includes a CU-CP 831, a CU-UP 832, a DU 833, and an RRU 834.

The ML engine 113 for dynamic BWP allocation is implemented as a micro service-based application in a RAN data analytics and artificial intelligence (AI) platform 825 of the RIC 820. The DU 833 feeds required inputs to the ML engine 113 of the RIC 820 through the E2 interface 843 using the E2AP RIC indication message. The ML engine 113 manages "near RT" delay while generating the output from the NN model. The MC 820 informs the CU 831 to trigger RRC signaling for adapting the optimal BWP through the E2 interface 843. In an embodiment, a new E2SM message type and content is designed for sending the inputs to the ML engine 113 of the MC 820 and for intimating the CUs 831 and 832 for the RRC signalling.

Figure 9:
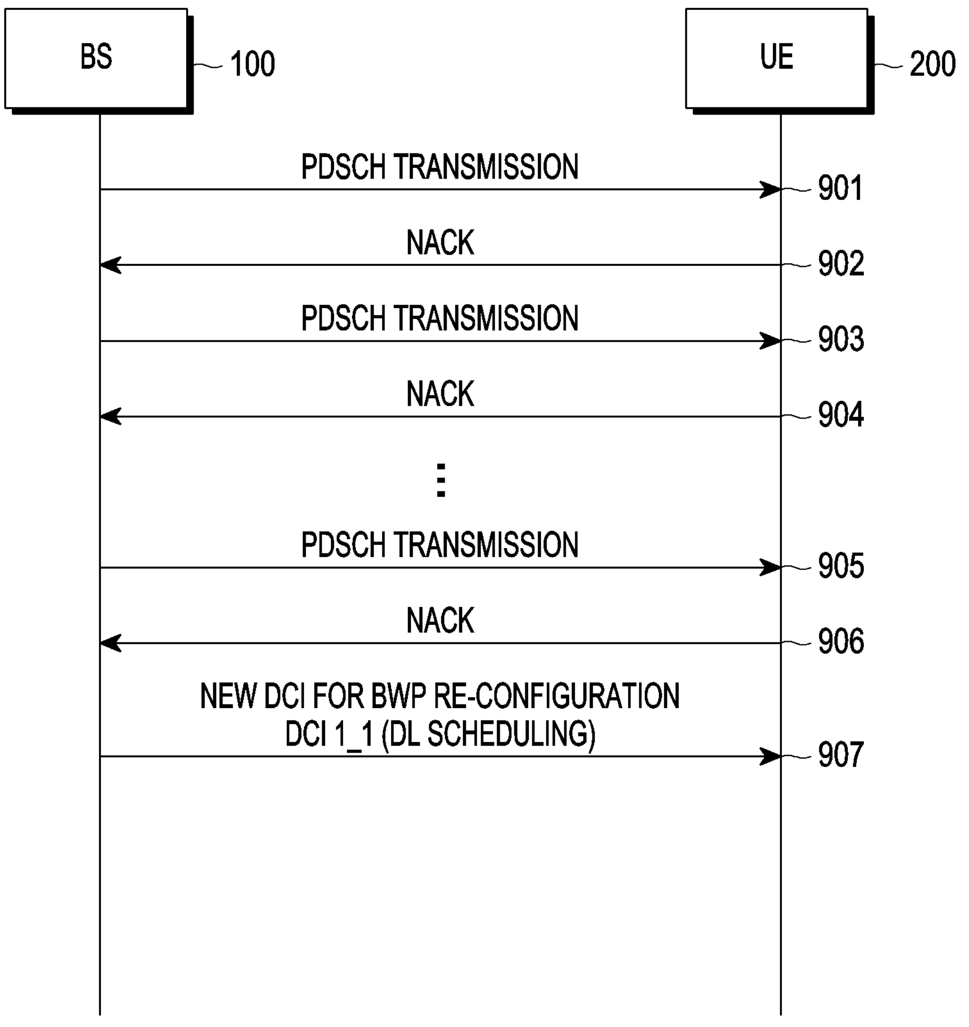
FIG. 9 is a sequential diagram illustrating signaling between the BS and the UE to detect the necessity of updating the BWP/SCS and indicate the UE about updating the BWP/SCS through a downlink control information, according to an embodiment as disclosed herein.

FIG. 9 is a sequential diagram illustrating signalling between the BS 100 and the UE 200 to detect the necessity of updating the BWP/SCS and indicate the UE 200 about updating the BWP/SCS through a DCI, according to an embodiment as disclosed herein.

In an embodiment such as illustrated in FIG. 9, the BS 100 signals the PDSCH transmission to the UE 200 at 901. Further, the BS 100 receives NACKs for the PDSCH transmission from the UE 200 at 902. In an embodiment, the BS 100 detects that the update of the BWP/SCS is necessary for the UE 200, in response to observing 'M' continuous NACKs at 904 and 906 each in response to corresponding PDSCH transmissions at 903 and 905, for a predetermined number M, and further observing that the doppler frequency value is higher than the threshold value. In another embodiment, the BS 100 detects that the update of the BWP/SCS is necessary for the UE 200, in response to observing 'M' number of NACKs obtained in response to a last 'K' PDSCH transmissions, for a predetermined number K>M, and further observing that the doppler frequency value is higher than the threshold value. The BS 100 signals the DCI (i.e. DCI 1_1) for BWP re-configuration/switching to the UE 200 at 907, in response to determining that the update of the BWP/SCS is necessary for the UE 200. Further, the UE 200 can update the BWP/SCS based on the BWP/SCS information.

Figure 10:
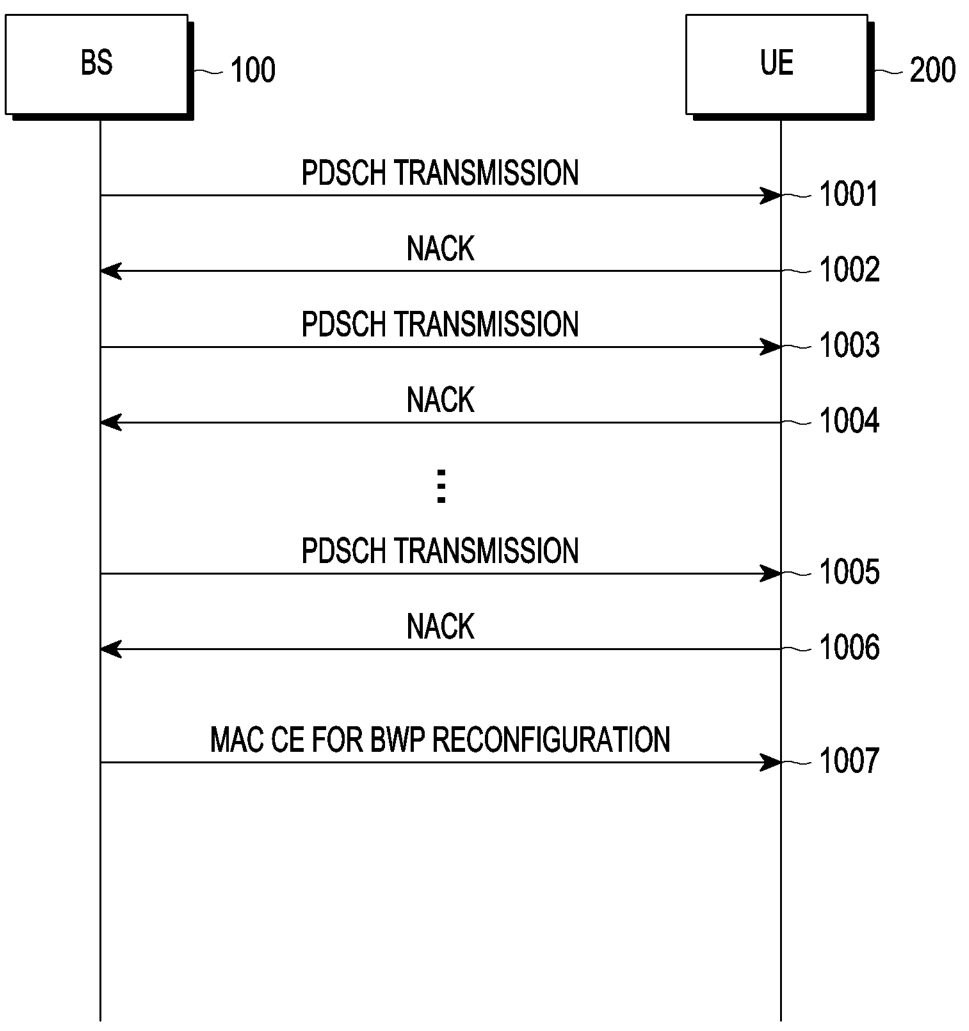
FIG. 10 is a sequential diagram illustrating signaling between the BS and the UE to detect the necessity of updating the BWP/SCS and indicate the UE about updating the BWP/SCS through a medium access channel control element, according to an embodiment as disclosed herein.

FIG. 10 is a sequential diagram illustrating signalling between the BS 100 and the UE 200 to detect the necessity of updating the BWP/SCS and indicate the UE 200 about updating the BWP/SCS through a medium access channel-control element (MAC-CE), according to an embodiment as disclosed herein.

In an embodiment such as illustrated in FIG. 10, the BS 100 signals the PDSCH transmission to the UE 200 at 1001. Further, the BS 100 receives NACKs for the PDSCH transmission from the UE 200 at 1002. In an embodiment, the BS 100 detects that the update of the BWP/SCS is necessary for the UE 200, in response to observing 'M' continuous NACKs at 1004 and 1006 each in response to corresponding PDSCH transmissions at 1003 and 1005, for a predetermined number M, and further observing that the doppler frequency value is higher than the threshold value. In another embodiment, the BS 100 detects that the update of the BWP/SCS is necessary for the UE 200, in response to observing 'M' number of NACKs obtained in response to a last 'K' PDSCH transmissions, for a predetermined number K>M, and further observing that the doppler frequency value is higher than the threshold value. The BS 100 signals the MAC CE for BWP re-configuration/switching to the UE 200, in response to determining that the update of the BWP/SCS is necessary for the UE 200, at 1007.

Figure 11:
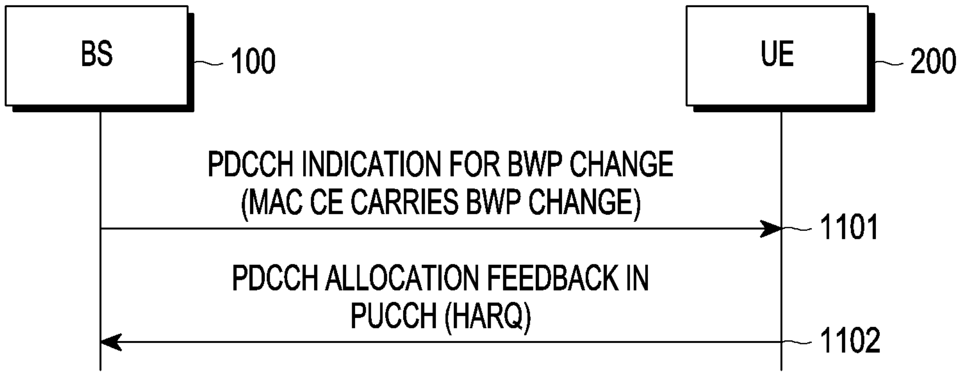
FIG. 11 is a sequential diagram illustrating signaling between the BS and the UE to indicate a status of updating the BWP or the SCS at the UE, according to an embodiment as disclosed herein.

FIG. 11 is a sequential diagram illustrating signalling between the BS 100 and the UE 200 to indicate a status of updating the BWP or the SCS at the UE 200, according to an embodiment as disclosed herein.

In an embodiment such as illustrated in FIG. 11, the BS 100 signals a physical downlink control channel (PDCCH) indication to the UE 200 for the BWP change at the UE 200 at 1101, where the MAC CE in the PDCCH indication triggers the BWP change at the UE 200. The UE 200 signals a PDCCH allocation feedback through a physical uplink control channel (PUCCH) to the BS 100 with or without a hybrid automatic repeat request (HARQ) at 1102. When the HARQ is present in the PDCCH allocation feedback, then the BS 100 detects that the status of updating the BWP at the UE 200 is a failure. When the HARQ is absent in the PDCCH allocation feedback, then the BS 100 detects that the status of updating the BWP at the UE 200 is a success.

The foregoing description of the specific embodiments may so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art may recognize that the embodiments herein can be practiced with modification within the scope of the embodiments as described herein.

What is claimed is:

1. A method of resource allocation of a user equipment (UE) in a wireless network, comprising:

receiving, at a base station (BS), a plurality of mobility parameters of the UE;

providing, by the BS, a service on an active bandwidth part (BWP) of a plurality of BWPs to the UE;

detecting, by the BS, a change in at least one mobility parameter of the plurality of mobility parameters;

determining, by the BS, whether the change in the at least one mobility parameter meets a quality of service (QoS) or QoS class indicator (QCI) criterion;

in response to determining that the change in the at least one mobility parameter meets the QoS or QCI criterion, selecting, by the BS, a subcarrier spacing (SCS) for the active BWP, and changing a current SCS of the active BWP to the SCS; and indicating, by the BS, the change in the current SCS to the UE.

2. The method as claimed in claim 1, wherein the SCS is selected in response to determining that a capability of the UE does not allow switching from the active BWP to a passive BWP of the plurality of BWPs and allows to change the current SCS of the active BWP.

3. The method as claimed in claim 1, wherein one of the SCS is selected based on output obtained by inputting the plurality of mobility parameters of the UE to a trained machine learning (ML) model.

4. The method as claimed in claim 3, wherein the trained ML model includes a neural network (NN) model trained by:

inputting the plurality of mobility parameters of the UE and a plurality of mobility parameters of other UEs to a plurality of input NN nodes of the NN model;

determining a weight of each of the plurality of input NN nodes based on a training method; and training the NN model based on the weight of each of the plurality of input NN nodes, the plurality of mobility parameters of the UE, and the plurality of mobility parameters of other UEs.

5. The method as claimed in claim 1, wherein the at least one mobility parameter comprises at least one of channel conditions, a QCI of the UE, a QoS of the UE, a number of acknowledgements (ACKs) received from the UE, a number of continuous negative-acknowledgements (NACKs) received from the UE, a rate of receipt of the NACKs, an infinite impulse response (IIR) average of NACK values that crosses a threshold NACK value, and a number of NACKs obtained in response to a predetermined number of last transmissions received from the UE.

6. The method as claimed in claim 1, wherein the method further comprises indicating, by the BS, the change in the current SCS of the active BWP to the SCS, to at least one neighbor BS and to at least one other UE associated with the BS.

7. A base station (BS) configured to reallocate resources of a user equipment (UE) in a wireless network, comprising:

a memory;

at least one processor; and a resource allocation engine coupled to the memory and the at least one processor, configured to:

receive a plurality of mobility parameters of the UE, provide a service on an active bandwidth part (BWP) of a plurality of BWPs to the UE, detect a change in at least one mobility parameter from the plurality of mobility parameters, determine whether the change in the at least one mobility parameter meets a quality of service (QoS) or QoS class indicator (QCI) criterion, in response to determine that the change in the at least one mobility parameter meets the QoS or QCI criterion, select a subcarrier spacing (SCS) for the active BWP, and change a current SCS of the active BWP to the SCS, and indicate the change in the current SCS to the UE.

8. The BS as claimed in claim 7, wherein the SCS is selected in response to determining that the capability of the UE does not allow switching from the active BWP to a passive BWP of the plurality of BWPs and allows to change the current SCS of the active BWP, and wherein the SCS is selected based on output obtained by inputting the plurality of mobility parameters of the UE to a trained machine learning (ML) model.

9. The BS as claimed in claim 8, wherein the trained ML model includes a neural network (NN) model trained by:

inputting the plurality of mobility parameters of the UE and a plurality of mobility parameters of other UEs to a plurality of input NN nodes of the NN model;

determining an weight of each of the plurality of input NN nodes based on a training method; and training the NN model based on the weight of each of the plurality of input NN nodes, the plurality of mobility parameters of the UE and the plurality of mobility parameters of other UEs.

10. The BS as claimed in claim 7, wherein the at least one mobility parameter comprises at least one of channel conditions, a QCI of the UE, a QoS of the UE, a number of acknowledgements (ACKs) received from the UE, a number of continuous negative-acknowledgements (NACKs) received from the UE, a rate of receipt of the NACKs, an infinite impulse response (IIR) average of NACK values that crosses a threshold NACK value, and a number of NACKs obtained in response to a predetermined number of last transmissions received from the UE.

11. The BS as claimed in claim 7, wherein the resource allocation engine is configured to:

indicate the change in the current SCS of the active BWP to the SCS to at least one neighbor BS and to at least one other UE associated with the BS.

* * * * *